Figure 6:
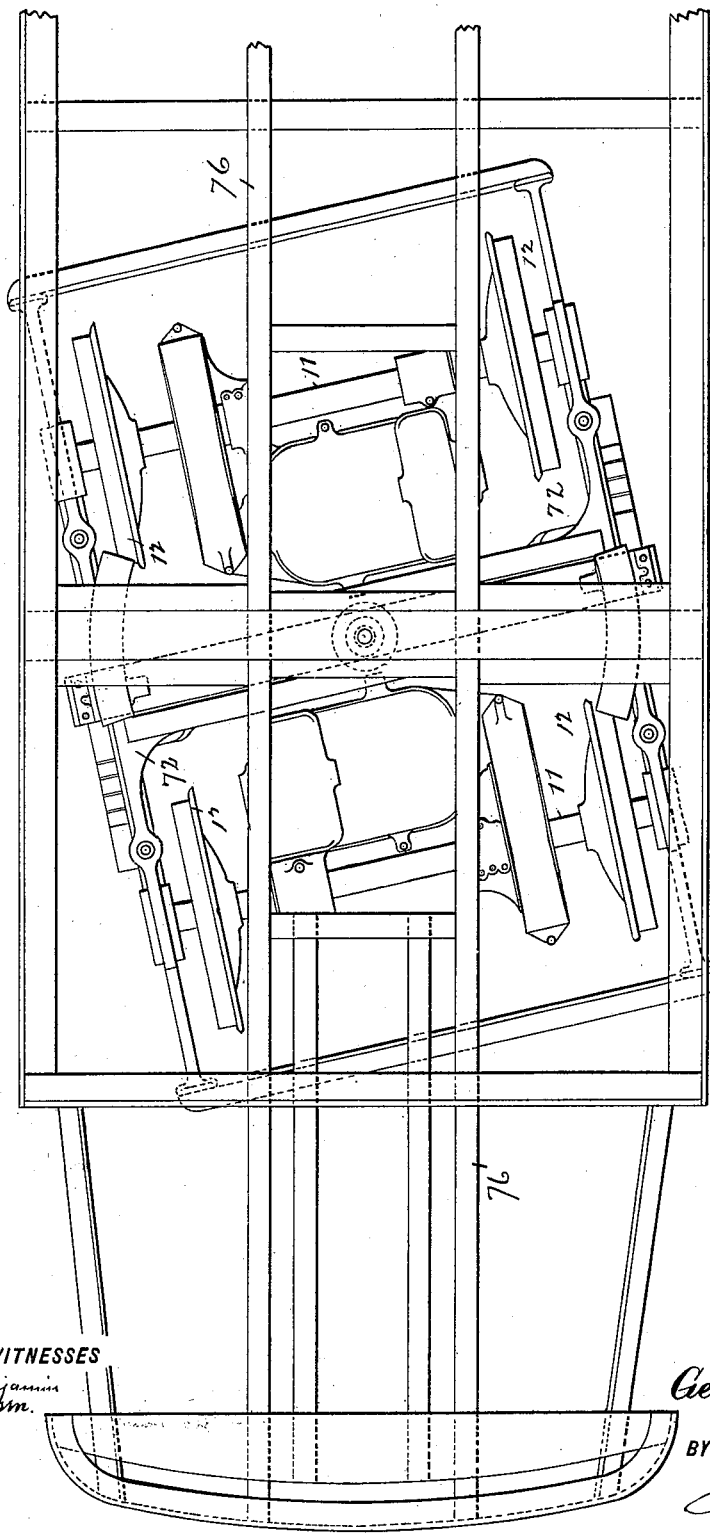

No. 627,898. Patented June 27, 1899.
G. M. BRILL.
CAR TRUCK FOR MOTOR PROPULSION, &c.
(Application filed July 3, 1897.)
(No Model.) 5 Sheets—Sheet 1.
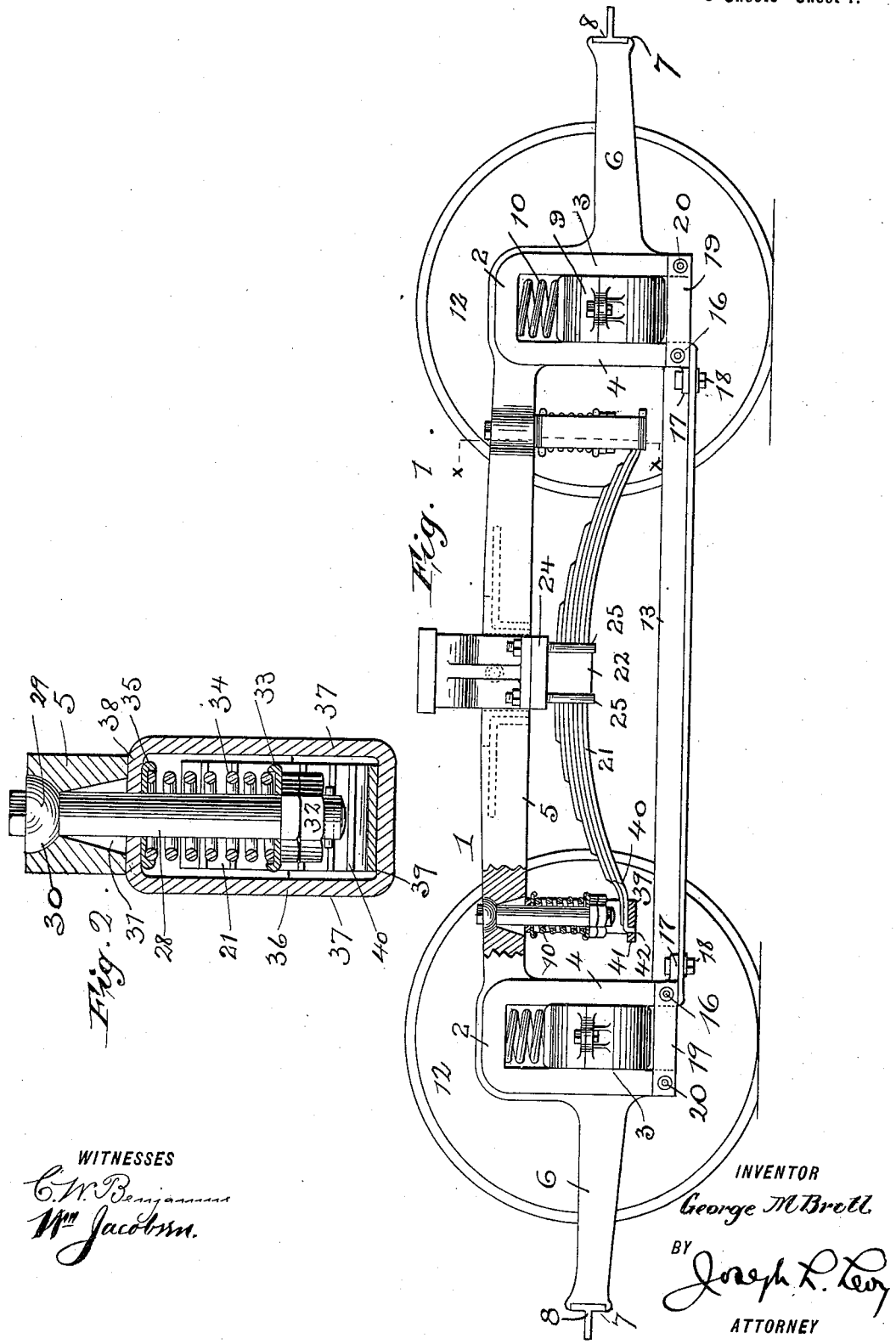
WITNESSES
INVENTOR
George M. Brill
BY
Joseph L. Levy
ATTORNEY No. 627,898. Patented June 27, 1899.
G. M. BRILL.
CAR TRUCK FOR MOTOR PROPULSION, &c.
(Application filed July 3, 1897.)
(No Model.) 5 Sheets—Sheet 2.
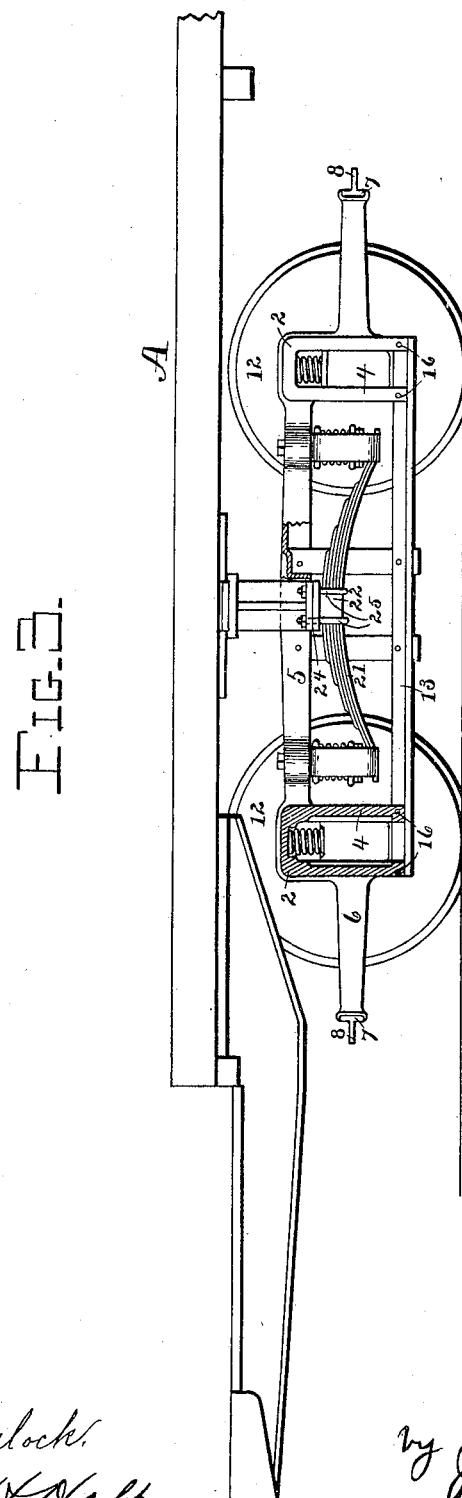
Witnesses
D. H. Blakelock.
John H. Holt.
Inventor
Geo. M. Brill,
by Joseph L. Levy,
Attorney
THE NORRIS PETERS CO., PHOTO-LITHO., WASHINGTON, D. C.

No. 627,898. Patented June 27, 1899.
G. M. BRILL.
CAR TRUCK FOR MOTOR PROPULSION, &c.
(Application filed July 3, 1897.)
(No Model.) 5 Sheets—Sheet 3.
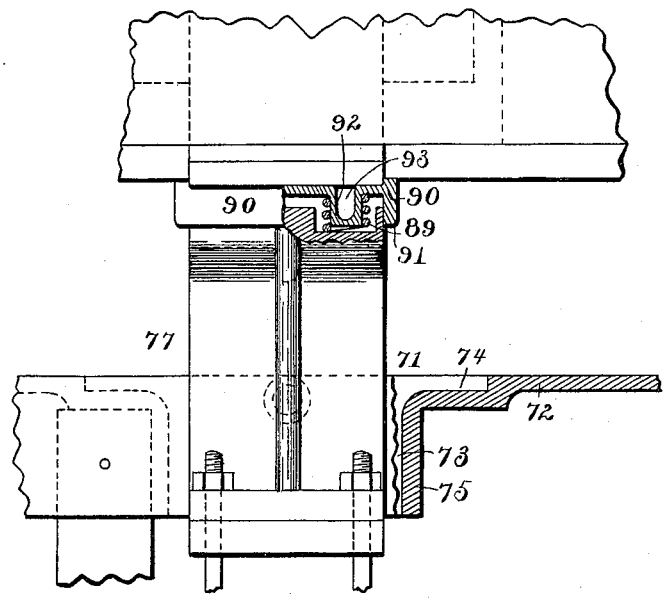
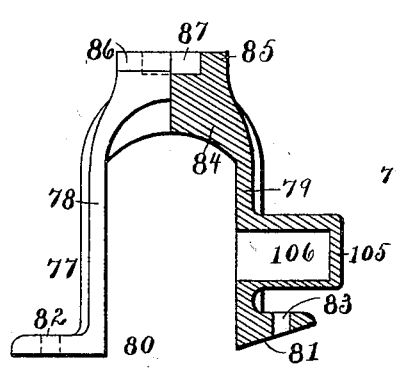 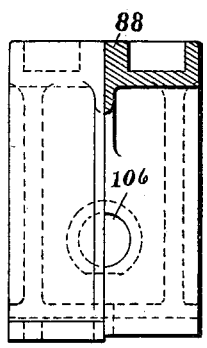 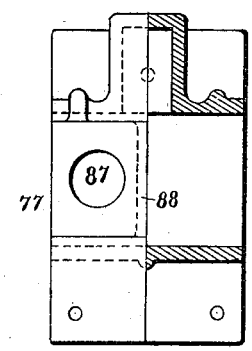
Witnesses
D. H. Blakeloch
John N. Holt
Inventor
Geo. M. Brill,
by Joseph L. Levy,
Attorney.

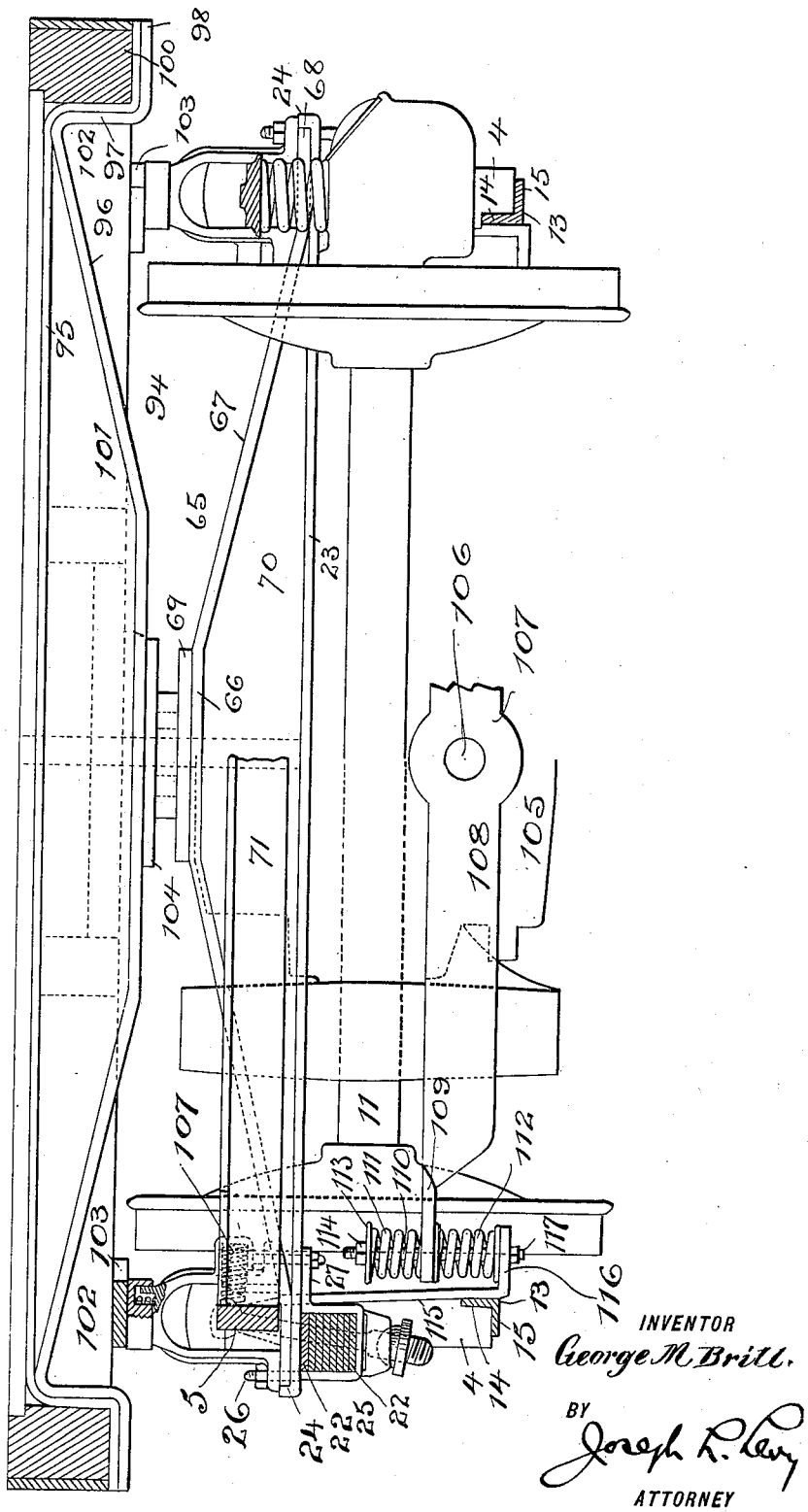

No. 627,898. Patented June 27, 1899.
G. M. BRILL.
CAR TRUCK FOR MOTOR PROPULSION, &c.
(Application filed July 3, 1897.)
(No Model.) 5 Sheets—Sheet 5.

WITNESSES
INVENTOR
George M. Brill
BY
Joseph R. Levy
ATTORNEY

UNITED STATES PATENT OFFICE.

GEORGE M. BRILL, OF PHILADELPHIA, PENNSYLVANIA.

CAR-TRUCK FOR MOTOR PROPULSION, &c.

SPECIFICATION forming part of Letters Patent No. 627,898, dated June 27, 1899.

Application filed July 3, 1897. Serial No. 643,339. (No model.)

*To all whom it may concern:*

Be it known that I, GEORGE M. BRILL, a citizen of the United States, residing at the city of Philadelphia, county of Philadelphia, and State of Pennsylvania, have made certain new and useful Improvements in Car-Trucks for Motor Propulsion and the Like, of which the following is a specification.

My invention relates to improvements in car-trucks generally, and it has special relation to improvements in car-trucks designed for the purpose of carrying a motor for electric propulsion and the like.

My invention consists in the construction and combination of parts hereinafter described and further pointed out in the claims.

In the drawings forming part of this specification, Figure 1 is a side elevation of a truck embodying my improvements; Fig. 2, a sectional elevation, enlarged, taken substantially on the line $x\,x$, Fig. 1, illustrating the construction of one of the spring link-hangers; Fig. 3, a side elevation of a truck embodying my improvements, partly in section, and a portion of the car-body mounted thereon. Fig. 4 is an enlarged side elevation of a portion of the truck-frame, the side bearing-yokes, and a portion of the car-body. Fig. 5 is an enlarged end view of the truck and a portion of the car, the car being partly in section and the truck being in section on two transverse planes. Fig. 6 is a plan view of the truck and a portion of the car-body. Fig. 7 is an enlarged side elevation of the side bearing-yoke, one-half of which is in sectional elevation centrally and transversely thereof. Fig. 8 is a front elevation of the side bearing-yoke, one-half of which is in sectional elevation substantially through the center thereof. Fig. 9 is a plan view of the same, one-half being in longitudinal section.

Similar numerals of reference indicate corresponding parts throughout the several views.

The frame of the truck, which as to its general features I make no claim in this application, consists substantially of the side frames 1, each frame having inverted-U-shaped axle-box yokes 2 of the usual form, except as hereinafter described, each yoke having depending inner and outer box-controlling arms 3 4, a side bar or upper chord 5, uniting the yokes at or near the top thereof, and extensions 6, leading outwardly from the yoke-arms 3, between the limits of said arms, said extensions having recesses 7 in their ends, in which is seated a T-iron cross-bar 8 at each end to unite the side frames into one complete truck-frame.

In the axle-box yokes or pedestals are axle-boxes 9, and between the tops of the boxes and the upper portion of the yokes 2 are springs 10, and at 11 are the axles and 12 the wheels, all of the usual or desired construction.

Certain parts of the construction of the side frames are embodied in the improvements which I have made, as follows: Instead of the usual pedestal tie-bar I have adopted a stronger and much more economical form of construction, and have employed an angle-iron 13, extending between the lower portions of the yoke-arms, and have secured said angle-iron to said yoke-arms by recessing the inner faces of said yoke-arms to receive the upright web 14. The horizontal web 15 of the angle-iron, which will be hereinafter termed the "pedestal tie-bar," lying flat against the bottom of the yoke-arms, and by means of bolts 16 have secured the pedestal tie-bar to the yoke-arms. This construction, as shown in Figs. 3 and 5, effectively ties the yokes or pedestals together and strengthens the arms of the yokes by crossing the space between them. Instead, however, of employing the continuous pedestal tie-bar I can employ the construction shown in Fig. 1, in which the tie-bar 13 extends only between the inner arms 4 of the yokes 2, the inner arms 4 being provided with outwardly-extending lugs 17, to which the web 15 of the tie-bar is secured by the bolts 18, and between the arms 3 4 extend cross-bars 19 on one or both sides, effectively tying them together, bolts 20 securing the cross-bars to the arms, and the bolts 16, which pass through the arms 4, securing the pedestal tie-bar and cross-bar to such arms, making a strong, cheap, and effective structure, allowing of the cross-bars to be removed for the purpose of removing the axle-boxes and wheels from the truck without removing the tie-bar 13.

Hereinafter the side bar 5 and pedestal tie-bar may be referred to as the "upper and lower chords," respectively, they being so generically designated with other improvements which I have made, wherein the particular structure of truck-frame does not specifically enter as an essential.

Between the upper and lower chords or below the upper chord or upper member of the side frame where no lower chord is used I locate two semi-elliptic springs 21, arched upwardly, banded centrally, as at 22, one spring beneath each of said upper members, which springs are designed to carry and support the car-body, such springs being the main springs of the spring system comprising said elliptics, the springs in the links hereinafter to be described, and others. The semi-elliptic longitudinally-disposed springs not only afford efficient spring-support of the car-body on the truck, but act in a measure as equalizers, distributing the weight equally on the axle-boxes. These springs are supported or hung from the truck-frame, specifically from the side bars 5, such support being such as to allow of a transverse swing of the springs and truck-bolster in unison and also of a longitudinal swing of the supports to allow of the lengthening out of the spring when under compression. These springs are transversely connected rigidly together below the side bars, so that both springs swing in unison with each other and with the center bearing and side bearings. To effect this a flat bar 23 is employed, the ends of which are upturned, as shown at 24, Fig. 5, to form lips, and to the bar 23 the springs are securely fixed, as shown at Fig. 5, by two straps 25, which encircle the spring and lie at each side of the central tie-band 22 of the spring, the bar resting on top of the tie-band, each strap being provided with an upwardly-extended end 26, exteriorly screw-threaded and which passes through the bar 23, and an inner and right-angled extension 27, which lies underneath said bar. This bar 23 in itself constitutes a bolster, to which side bearings and a center bearing can be secured in the usual or desired way.

Referring now to the means employed for supporting the semi-elliptic springs from the truck-frame, I can use the form of hangers or links either that shown in Figs. 1 and 2 or those shown in Fig. 3, the form shown in Figs. 1 and 2 being preferred, while those shown in Fig. 3 form the subject-matter of applications filed by me on the 8th day of November, 1897, Serial Nos. 657,969 and 657,970.

The forms shown in Figs. 1 and 2 are extensible links in which a spring is interposed and are constructed substantially as follows: At 28 is a bolt provided with a semispherical head 29, seated in a like recess 30 in the side bar, the bolt passing through a recess or aperture 31 formed in the bar, widening out as it reaches the under side of the side bar, and forming a conoidal, pyramidal, or triangular aperture in which the bolt can play longitudinally or transversely on its seat in the side bar, the head and the socket formed for the same by the seat 30 forming a universal joint, permitting unrestricted variation in the movement of the bolt. The bottom portion of the bolt is screw-threaded and carries a movable nut or nuts 32, both for the purpose of forming an efficient seat and to allow of a separation of the parts, and on the nut is a spring-cup 33, and on the spring-cup is a helical or spiral spring 34, which encircles the bolt and extends upwardly toward the side bar, on which spring rests a cap 35, through which the bolt passes. At 36 is a rectangular strap or hanger comprising upright sides 37 and top and bottom cross-bars 38 39, the top cross-bar being provided with an aperture through which the bolt 28 passes, the top cross-bar 38 resting on the cap 35, the semi-elliptic springs resting at their outer ends 40 upon the bottom cross-bar 39 of the strap, and in order to effectively tie the bands of the semi-elliptic springs to the links a lug 41 is formed on the bottom cross-bar 39, a transverse aperture is formed in the cross-bar adjacent to and at the rear of said lug, and the lower leaf of said spring 21 is provided with a downwardly-extending finger or lug 42, which enters said aperture, the end of the spring lying flat on the bottom cross-bar. With this construction the ends of the spring 21 will not slide in the strap 36 during the former's extension, but will move the strap and the entire supporting-link longitudinally with it. There are four of these links, two on each side for each one of the springs 21.

Weight placed upon the bolster, thus far indicated by the cross-bar 23, will be primarily taken upon the semi-elliptic springs, from thence transferred to the interposed springs 34 in the links, from thence to the side frames, and finally on the pedestal-springs 10, and ultimately to the axle-boxes. Thus it will be noticed that I employ thus far three sets or series of springs for the support of the car on the truck—those between the axle-boxes and the pedestals, (indicated at 10,) the semi-elliptics 21, and the link-springs 34, which support the semi-elliptics from the side frames, which latter I prefer to make of a greater carrying or resisting capacity than those located between the axle-boxes and pedestals.

The location of the semi-elliptic springs outside of the wheel-gage on each side of the truck, together with the location of the links for supporting the semi-elliptics closely adjacent to the axle-boxes, and the swinging of said springs from the truck-frame from such points gives a better support for the car-body than does the usual link-hung bolster supported from the truck-transoms within the wheel-gage. These general features of construction, however, are embraced in an application filed by Samuel M. Curwen and myself on the 3d day of November, 1896, Serial No. 610,902, and therefore I do not claim the same herein.

With the before-stated form of suspension the bolster, thus far illustrated by the cross-bar 23, and the semi-elliptic springs, to which said bolster is rigidly attached, can have a transverse swing all in unison, and for the purpose of enabling a rigid connection between the ends of the semi-elliptic springs and the suspending-links to be had the suspension of the links is of such a character as to swing longitudinally under the influence of the extension of the semi-elliptic springs while under pressure of the load.

The specific form of bolster construction employed herein is not essential, although very desirable.
As will have been previously noted, instead of employing the semi-elliptic springs in their usual position between a spring or sand plank hung from transoms and a bolster I have supported the bolster directly upon the semi-elliptic springs, arranged them longitudinally within the plane of the side frames, and supported the ends of the semi-elliptic springs from the truck-frame by other springs forming part of the truck spring system, thus enabling me to do away entirely with the springs usually interposed between the sand or spring plank and the bolster proper. The cross-bar can therefore be said to be either a spring-plank or a bolster, depending upon the character of its employment. If by choice other springs are supported upon the cross-bar 23— a center bearing or side bearings supported upon the cross-bar by springs—it would specifically be a spring-plank; but when employed in the construction hereinafter described, where the side bearings are spring-supported ultimately on the cross-bar and the center bearing rigidly mounted on the cross-bar, such cross-bar can be correctly termed either a "spring-plank" or a "bolster."

The bolster construction is as follows: Above the cross-bar lies the inverted arch-bar 65, having a central flat portion 66, deflected intermediate sections 67, and horizontal ends 68, resting on the ends of the cross-bar 23, the ends of the arch-bar abutting against the upturned lug 24 of the cross-bar to prevent spreading, and on the top of the arch or flat horizontal portion of the arch-bar is secured a truck center bearing 69 of any desired construction, and between the arch-bar 65 and the cross-bar 23 is interposed a blocking 70, conforming in outline to the space between the cross-bar and the arch-bar, which blocking can be of metal, wood, or any other desired material and constructed as desired.

At 71 are the transoms, formed of angle-iron, the ends of which are received in the lugs or brackets 72, extending inwardly from the side bars 5 on each side, the brackets being recessed, as shown in Fig. 4, to receive the ends of the webs 73 74 of the transoms, the horizontal web 74 lying flush with the top of the bracket and cross-bar, as shown in Figs. 4 and 6, the upright web 73 of the transom being opposed to the side of the bolster and in alinement with the cross-bar 23, arch-bar 65, and intermediate blocking 70, the ends of the transoms being secured to the upright web 75 of the bracket, thus affording an efficient guide and abutment for the bolster construction.

One of the objects of my invention is to place the car-body low down upon the truck, and thus provide a well-placed center of gravity, which is extremely desirable with the heavy cars and sharp curves in use in city and suburban street traffic, and to secure this end I have suspended the semi-elliptic car-springs within the limits of the side frames and below the upper member thereof and connected said springs transversely by a spring-plank or bolster, as hereinbefore described, below the upper member of said frames, as clearly shown in Figs. 1, 3, 4, and 5, and by means of the arched construction of the bolster elevating the truck center bearing 69 to a sufficient height between the wheels, as clearly shown in Fig. 5, which bearing lies below the top of the wheels, at the same time allowing the truck to swivel easily between the inner sills 76 of the car, as shown in Fig. 6.

In order to bring the side bearings up high enough to engage and support the car-body and to form guides for the springs 21 and bolster on the side bars 5, I have employed the yokes 77, (illustrated in Figs. 7, 8, and 9,) which comprise (preferably in one piece, as a casting of metal) the legs 78 79, from which at the bottom extend flanges 80 81, provided with bolt-holes 82 83, the legs forming a bifurcation united at the top by a head 84, at the top of which is a flat bed 85, having perpendicular sides 86, the legs being provided with intermediate ribbing integrally formed therewith to provide strength, and in the top of the head 84 are formed circular apertures 87, ranged longitudinally of the truck, between which is the central lug or boss 88, and in these apertures or recesses are located short spiral springs 89. (Seen in Figs. 4 and 5.) These springs support a cap 90, which acts as a side bearing, which cap has depending sides 91, embracing the sides of the yoke-head, and forms with the springs a spring-support for the car-body on the bolster, which spring-support must be differentiated from the spring-support provided by the springs interposed between the bolster and spring-plank in the usual constructions. The cap form of plate forms a housing for the protection of the springs in the top of the yokes, and by the irregular form of the cap and the head of the yoke all movement, except up and down, of the plate is prevented.

To prevent movement of the springs interposed between the yokes and the plate, I form lugs 92 on said cap or plate, which depend into the apertures 87 and enter into the springs 89 and confine the springs and cap in position, as clearly shown in Fig. 4, and I preferably form a depression or recess 93 in said lugs, opening out of the top of said plate, so that such plate can be provided with lubricant or antifriction metal.

The car-body (represented by A) is supported upon the truck center bearing 69 through the medium of the body-bolster 94, which is formed substantially like the truck-bolster, but inverted, the ends of the cross and arch bars 95 96 being bent into L shape, as shown at 97 98 in Fig. 5, to embrace the outer longitudinal sills 100, to which they are securely fastened, a filling 101 being interposed between the cross and arch bars, which may be a separate filling or a part of a cross-sill 102, to which the body rub-plates 103 are secured, the body center bearing 104 being secured to the arch portion of said body-bolster.

The truck and body bolster and their respective center bearings merely provide a swiveling and draft union of the truck with the car, the weight of the car being taken on the side bearings of the truck, the springs interposed between the side bearings and truck-bolster forming a further set of springs additional to those heretofore described for supporting the car, the springs supporting the truck side bearings being comparatively of small resistance or capacity, yieldingly supporting the car-body and allowing of a gentle resistance to the slight movements of the car without affecting to any appreciable degree the other springs in the system and relieving the car-body of the shocks which would be incident to the resistance of said movements were they met by heavier springs of the system.

The side bearing-yokes are further provided with a rearwardly-extending lug 105, having an internal chamber 106, forming the barrel for holding a spiral or other desired form of spring 107, Fig. 5, and the legs 78 79 of the yokes straddle the side bar 5, the space between the legs of the yoke and the side bar on both sides being sufficient to allow considerable transverse swing of the yoke-bolster and semielliptic springs without coming in contact with the side bar, which latter is substantially stationary, except when the axle-boxes are so constructed to bear on their inner sides, in which case they would be under the influence of the thrust of the axles. These "thrust-springs" 107, as they will be termed, impinge against the inner face of the side bar 5, as illustrated clearly in Fig. 5, and yieldingly oppose the transverse swing of the bolster. As the employment of these springs for this purpose is old, I make no claim to the same, except where they may enter into combination with some of the other novel features of improvement recited herein.

By reference to Figs. 2 and 5 it will be seen that the inner flange 81 on the inner leg 79 of the side bearing-yoke 77 is higher than the outer flange and the bottom is inclined at an angle and that the horizontal arms 27 of the straps 25, which embrace the semi-elliptic springs, extend quite some distance inwardly. The former is so disposed to allow of the inner leg 79 to rest upon the inclined portion 67 of the arch-bar 65, and the extension of the latter is had for the purpose of bringing an eye formed therein into alinement with the bolt-hole 83 in the flange 81. As before described, the outer upright portions 26 of the straps 25 extend upwardly through the ends of the cross-bar and arch-bar, and they further extend through the bolt-holes 82 in the flange 80 of the yoke, the ends extending above the top of the flange, and, together with a bolt, (shown in dotted lines, Fig. 5,) which extends through the strap extension 27, cross-bar 23, filling 70, arch-bar ends 68, and flange 81 and provided with nuts, firmly secure the semi-elliptic springs to the bolster, and the arch-bar, cross-bar, and yokes together making a firm, compact, and easily dismantled and assembled structure.

As my improvements have special relation to trucks employed in electric propulsion, I have devised a new form of support for a motor thereon.

The motor is conventionally illustrated at 105, one end being sleeved or otherwise suitably supported upon the truck-axle, although this is not essential to my present invention, and the other or free end spring supported from the truck-frame in the following manner:

The front of the motor or its casing is provided with an outwardly-extending lug 106, (shown in Figs. 5 and 6,) which engages with an eye 107, formed in a cross-bar 108 in the usual manner. This cross-bar is formed of a flat bar perpendicularly disposed, the ends of which are twisted or turned at right angles to the plane of the bar to form a spring-seat 109, having an aperture, through which a bolt 110 passes, there being one bolt for each end of the bar. About this bolt and above and below the seat 109 are spiral springs 111 112, and on the upper spring is a cap 113, confined by a nut 114, the bolt acting as a guide for the springs and a support for the bar.

At 115 are flat bars secured to the side bar 5 at their upper ends and to the pedestal tie-bar 13 at the lower end, as in Figs. 3 and 5, the ends of the bars being turned at an angle to form a spring-seat 116, as clearly shown in Fig. 5. This spring-seat support the springs 111 112, which in turn supports the cross-bar, and the cross-bar supports the free end of the motor, the springs offering a resilient resistance to the movement of the motor in both directions.

The bolt 110 can pass loosely through the seat 116 or be fixed thereto, a nut 117 being provided at its end in either case.

It will have been observed that many of the features of improvement herein can be modified or altered to suit particular conditions without departing from the spirit of my invention.

Having described my invention, I claim—

1. The combination with the running-gear of a truck, of the side frames located outside of the truck-wheel gage, transversely-swinging links hung from the side frames, longitudinally-disposed semi-elliptic springs suspended by spring-supported links below the top bar of said frame, a bolster supported on and transversely connecting said springs, and restraining-guides secured to the bolster ends and embracing said top bar, substantially as described.

2. The combination in a car-truck and its running-gear, of the side frames supported outside of the wheel-gage, extensible spring-links depending from the side frames, semi-elliptic springs supported by said links, and a bolster on and transversely connecting said latter springs, substantially as described.

3. The combination in a car-truck and its running-gear, of the side frames supported outside of the wheel-gage, the truck-bolster, longitudinally-disposed semi-elliptic springs hung from the side bars at or near the axle-boxes outside of the wheel-gage by spring-supported links, the bolster resting on and transversely connecting said semi-elliptic springs, and vertically-disposed guides extending between the bolster and side frames, substantially as described.

4. In a car-truck, the combination with means for pivotally securing a car on the truck, of supporting devices for said means, said devices comprising swing-links and longitudinally-disposed semi-elliptic springs connecting said links, the links being extensible in the direction of their length, and springs for opposing the extension of said links, substantially as described.

5. In a car-truck, the combination with car-pivoting devices, said devices comprising transversely-swinging links, semi-elliptic springs connecting the links, said links being extensible in the direction of their length, and an additional spring or springs to oppose such extension, substantially as described.

6. The combination of a truck having a frame, springs supported by said frame, hangers movably supported on said springs, semi-elliptic springs connecting said hangers, and means for supporting a car-body on the truck connected with said semi-elliptic springs, substantially as described.

7. The combination in a car-truck, its running-gear and side frames, of the inflexible bolts 28 movably secured to the side frames at or near the axle-boxes, springs 34 on the bolts, hangers on the springs 34, semi-elliptic springs connected at their ends with the hangers and a bolster supported on said semi-elliptic springs mounted so as to swing in unison with the said bolts and hangers from a point in the side frames, substantially as described.

8. The combination in a car-truck, of the side frames, extensible swing-links having load-supporting springs ranged in the direction of the length of the truck and pendent from the side frames, semi-elliptic springs ranged in the plane of the side frames and connecting the links, and a bolster supported on said semi-elliptic springs, substantially as described.

9. In a car-truck, the combination with the side frames, a bolster, the semi-elliptic springs supporting the bolster, swing-links supporting said semi-elliptic springs, and a spring in said links, substantially as described.

10. The combination in a car-truck, of the truck-frame, spring-links depending from the truck-frame, semi-elliptic springs connecting the links, and means for connecting said latter springs with a car-body, substantially as described.

11. The combination in a car-truck, of the truck-frame, transversely-swinging spring-links depending from the truck-frame, semi-elliptic springs connecting said links, and a bolster having car-connecting means on said latter springs, said bolster being fixedly secured to said springs and swinging in unison therewith, substantially as described.

12. The combination in a car-truck, of the side frames, with extensible, swinging links carrying springs, said links depending from the side frames, semi-elliptic springs connecting said links, and a bolster secured to said latter springs, substantially as described.

13. The combination in a car-truck, of the side frames, the semi-elliptic springs movably and resiliently suspended from the side frames, and a bolster secured to said springs, substantially as described.

14. In a car-truck, the combination with the side frames having axle-box pedestals, the longitudinally-disposed semi-elliptic springs, extensible and resilient connections between the ends of the said springs and the side frames at or near said pedestals, and a bolster secured to said springs, substantially as described.

15. In a car-truck, the combination with the side frames having axle-box pedestals, the bolster, longitudinally-disposed resilient supports for the bolster, and resilient connections between the ends of said supports and the side frames, substantially as described.

16. The combination in a car-truck, of the side frames having axle-box pedestals, each frame having an upper and lower chord, links supported from the upper chord by springs, longitudinally-disposed semi-elliptic springs supported between the chords by the said links, a transverse bolster resting on said semi-elliptic springs below the upper chord, and guides between said upper chord and bolster, embracing said chords, substantially as described.

17. The combination in a car-truck, of the side frames having axle-box pedestals, each frame having an upper and lower chord, longitudinally-disposed semi-elliptic springs lying between said chords of each frame, a spring-suspension for the ends of said semi-elliptic springs from the top chords, and a bolster supported on said latter springs and tying them together transversely, substantially as described.

18. The combination in a car-truck, of the side frames having axle-box pedestals, each frame having an upper and lower chord, semi-elliptic springs disposed between said chords, a swinging and extensible suspension for the ends of said semi-elliptic springs from the upper chord at or near the pedestals, and springs included in said suspension, substantially as described.

19. The combination in a car-truck, of the side frames, the semi-elliptic springs, a cross-bolster secured to said semi-elliptic springs, links suspended from the side bars and attached to said springs, and further springs carried by said links adapted to oppose the motion of the side frames or the semi-elliptic springs, substantially as described.

20. In a car-truck, the combination of the side frames, the links suspended from the side frames, each link carrying a double-acting spring, semi-elliptic springs secured to said links and a bolster secured to said semi-elliptic springs, substantially as described.

21. The combination in a car-truck of the side frames having axle-box pedestals, springs interposed between the axle-boxes and the pedestals, a bolster, springs hung from the side bars, a resilient support for said bolster on said springs, side bearings and springs for supporting the side bearings on the bolster, substantially as described.

22. The combination in a car-truck, of the side frames having axle-box pedestals, springs interposed between the axle-boxes and pedestals, a bolster, springs hung from the side bars, and a resilient support for said bolster on said latter springs, substantially as described.

23. The combination in a car-truck, of the side frames having axle-box pedestals, springs interposed between the axle-boxes and said pedestals, a further set of springs supported by the side frames, a bolster supported by said further set of springs, other springs on the bolster, and side bearings supported by the latter springs, substantially as described.

24. The combination in a car-truck, of the side frames having axle-box pedestals, springs interposed between the axle-boxes and said pedestals, a further set of springs supported by the side frames, a resilient element supported by said further springs, a bolster on said element, other springs on the bolster, and side bearings on said latter springs, substantially as described.

25. The combination in a car-truck, of the side frames having axle-box pedestals, springs interposed between the axle-boxes and said pedestals, a further set of springs supported by the side frames, semi-elliptic springs supported by said further springs, a bolster transversely connecting said semi-elliptic springs, other springs on the bolster, and side bearings on said latter springs, substantially as described.

26. The combination in a car-truck, of the side frames having axle-box pedestals, springs interposed between the axle-boxes and said pedestals, links with interposed springs supported from the side frames, a bolster supported by said link-springs, springs on the bolster and side bearings on said latter springs, substantially as described.

27. The combination in a car-truck, of the side frames having axle-box pedestals, spiral springs interposed between the axle-boxes and said pedestals, a set of spiral springs of greater carrying capacity supported from the side bars, semi-elliptic springs connecting said latter springs, and a bolster on said semi-elliptics, substantially as described.

28. The combination in a car-truck, of the side frames having axle-box pedestals, spiral springs interposed between the axle-boxes and said pedestals, spiral springs of greater carrying capacity supported from the side bars, a resilient equalizing connection between said latter spiral springs, a bolster on said connection, springs on the bolster, and side bearings on said springs, substantially as described.

29. The combination in a car-truck, of the side frames having axle-box pedestals, spiral springs interposed between the axle-boxes and said pedestals, spiral springs of greater carrying capacity supported from the side bars, semi-elliptic springs supported by said latter springs, a bolster on said semi-elliptics, springs on the bolster, and side bearings on said springs, substantially as described.

30. In a car-truck, the combination with the side frames, of the longitudinal leaf-springs, a bolster tying said springs together, links pendent from the truck-frame and adapted to move perpendicularly relatively to said frame, the ends of said springs resting on said links, and further springs adapted to resist the downward movement of the links, substantially as described.

31. In a car-truck, the combination with a truck-frame having upper and lower chords on each side, upwardly-arched semi-elliptic springs disposed below the upper chords, a cross-bolster secured to the arch of said springs below the upper chord, spiral springs deriving their support from the upper chords, and a perpendicularly-movable connection between spiral springs and the ends of the semi-elliptics, substantially as described.

32. A truck having a frame, a car-body and means for supporting the body on the truck, comprising longitudinal semi-elliptic springs, links extending between the ends of the semi-elliptic springs and the truck-frame, and spiral springs adapted to coact with the semi-elliptic springs in supporting the car-body, substantially as described.

33. A truck having a frame, a car-body, combined with means for upholding the body on the truck, comprising semi-elliptic springs, spiral springs, adapted to coact with the ends of the semi-elliptics, and connections between the ends of said semi-elliptics and the truck-frame, substantially as described.

34. The combination in a car-truck, of the side frames, transversely-swinging links pendent from the side frames, horizontal semi-elliptic springs suspended by said links, a bolster on said springs, guides extending between said bolster and frames, and springs between said guides and said frames, substantially as described.

35. The combination in a car-truck, of the side frames, the pendent swing-links, springs supported on the links, horizontal semi-elliptic springs suspended by said links and springs, and a bolster on said elliptic springs, substantially as described.

36. The combination, in a car-truck, of the side frames, the pendent links hung to swing in the direction of the length of the side frames, springs on the links, horizontal semi-elliptic springs supported by said link-springs, a bolster on said semi-elliptics, and guides between the bolster and side frames, substantially as described.

37. The combination in a car-truck, of the side frames, the pendent swing-links, springs supported on the links, horizontal semi-elliptic springs suspended by said link-springs, and a bolster transversely connecting and resting on said semi-elliptics, substantially as described.

38. The combination, in a car-truck, of the side frames, the pendent swing-links, springs supported on the links, horizontal semi-elliptic springs suspended by said link-springs, a bolster transversely connecting and resting on said semi-elliptics, springs on the bolster, and side bearings on said springs, substantially as described.

39. The combination in a car-truck, of the side frames, the transversely-swinging pendent links, said links being extensible in the direction of their length, springs on said links, horizontally-disposed semi-elliptic springs connecting said links and resting on the link-springs, and a cross-bolster rigidly secured to said semi-elliptics, the semi-elliptics, the links and bolster swinging bodily together, substantially as described.

40. The combination in a car-truck, of the side frames, the transversely-swinging links depending below the upper element of the side frames, the semi-elliptic springs disposed below said upper element and connected at their ends with said links, a bolster secured to said springs below the said element, guides extending between said element and the bolster and springs interposed between said guides and said element, substantially as described.

41. The combination, in a car-truck, of the side frames having upper and lower chords, the transversely-swinging links depending below the upper chord of each of the side frames, the semi-elliptic springs disposed below said upper chord on each side and connected at their ends with said links, a bolster secured to said springs below said chord, a yoke on each end of said bolster embracing said chord, and a thrust-spring between each of said yokes and said chord, substantially as described.

42. The combination in a car-truck, of the side frames, the transversely-swinging links having interposed springs depending below the upper element of each of the frames, the semi-elliptic springs disposed below the said element on each side and connected at their ends with said links, a bolster secured to said springs below said element, a yoke on each end of the bolster embracing each of said elements, a spring on the yokes, and side bearings on the springs, substantially as described.

43. The combination in a car-truck, of the side frames, extensible links, each with an interposed spring hung on the side frames, semi-elliptic springs suspended by said link-springs, and a bolster supported by said semi-elliptics, substantially as described.

44. The combination in a car-truck, of the side frames, the pendent, transversely-swinging links suspended from the side frames, semi-elliptic springs connecting said links, a bolster on said springs, yokes on the bolster embracing the side frames, and further springs in the yokes bearing against the side frames, substantially as described.

45. The combination in a car-truck, of the side frames, hangers pivotally suspended from said frames, each of said hangers having a bolt, a follower on the bolt, a spring interposed between the hanger and follower, semi-elliptic springs secured at their ends to said hangers, and a bolster on said semi-elliptic springs, substantially as described.

46. The combination in a car-truck, of the side frames, swing-links hung from the side frames, the horizontal semi-elliptic springs suspended by the links, a bolster secured on said springs, yokes on the ends of the bolster embracing a part of each of said frames, springs on the yokes, and side bearings on the springs, substantially as described.

47. The combination in a car-truck, of the side frames having upper and lower chords, horizontal semi-elliptic springs suspended from the upper chords, a bolster secured to said springs below the upper chords, yokes embracing the upper chords and secured to the ends of the bolster, springs on the yokes, and side bearings on the springs, substantially as described.

48. The combination in a car-truck, of the side frames, the horizontal semi-elliptic springs suspended from the side frames, a bolster secured on said springs, yokes on the bolster embracing a part of each of said frames, a spring on each of the yokes, and side bearings on the springs, substantially as described.

49. The combination in a car-truck, of the side bars, horizontal semi-elliptic springs suspended from and below the side bars, a bolster secured to said springs below the side bars, a yoke on each end of the bolster and embracing the side bars, a spring on each yoke, a center bearing on the bolster extending above the side bars, and a bearing on the yoke-springs, substantially as described.

50. The combination in a car-truck, of the side bars, the semi-elliptic springs suspended by and below the side bars, a yoke supported by each of the springs and straddling the side bar and extending above it, springs on the yokes, and side bearings on the yokes above the side bar, substantially as described.

51. In a car-truck, the combination of the side bars spring-supported on the axle-boxes, the semi-elliptic springs suspended from the side bars, a cross-bar uniting the latter springs below the side bars, the yokes on the semi-elliptic springs embracing the side bars, and side bearings on the yokes, substantially as described.

52. In a car-truck, the combination with the side bars, links depending from the side bars, a ball-and-socket connection between the links and side bars, semi-elliptic springs connecting the links, and a bolster on said semi-elliptics, substantially as described.

53. In a car-truck, the combination with the side bars and bolster, of links included in a support for the bolster on the side bars, said links having a ball-head, a conical aperture formed in the side bar for said links, and a seat for the link-ball in said aperture, substantially as described.

54. In a car-truck, the combination with the side bars and bolster, of the bolts depending from the side bars, a spring on each of the bolts, a strap movable on each of the bolts and resting on the spring, and connections between the straps and said bolster, substantially as described.

55. In a car-truck, the combination with the side bars, of the bolts depending from the side bars, a spring on each of the bolts, a strap movable on each of the bolts and resting on the spring, semi-elliptic springs, the ends of which rest on said straps and a bolster on said semi-elliptic springs, substantially as described.

56. The combination in a car-truck, of the side bars, the depending bolt, the spring-seat on the bolt, a spring on the seat encircling the bolt, a rectangular strap resting on said spring, the bolt passing through said strap, and a bolster supported on said strap through an intermediate connection, substantially as described.

57. The combination in a car-truck, of the side bars, a depending bolt, a head on the bolt engaging the side bar, a detachable nut on the lower end of the bolt, a rectangular, apertured strap, the bolt passing through said aperture, a spring about the bolt resting on said nut and supporting said strap, and a bolster supported on said strap through an intermediate connection, substantially as described.

58. The combination with the side bar of the bolt depending therefrom, a head on the bolt engaging the side bar, a seat on the bolt, a spring on the seat, a strap resting on said spring and engaging the bolt, a seat on the strap consisting of the cross-bar 39 having a transverse aperture, and a leaf-spring resting on the cross-bar, said leaf-spring having a lug on the end lying in said aperture, substantially as described.

59. The combination with the side bars, of the semi-elliptic springs supported thereon, a transverse bar resting on said springs, the flanged yokes on the bar embracing the side bars, and a strap secured to the ends of said bar and to the yoke-flanges and embracing said springs, substantially as described.

60. The combination with the side bars, of the semi-elliptic springs supported thereon, a tie-band about the center of the springs, a transverse bar resting on said band, the flanged yokes on the bar embracing the side bars, and U-shaped straps secured to the ends of said bar and to the flanges and embracing the said springs, substantially as described.

61. The combination with the side bars, of the longitudinally-disposed semi-elliptic springs suspended therefrom, a transverse bar resting on said springs below the side bars, the flanged yokes resting on the bar and embracing the side bars, straps connecting the yoke-flanges, transverse bar and springs, side bearings supported by said yokes, and a center bearing on said transverse bar, substantially as described.

62. The combination with the side bars, of the longitudinally-disposed semi-elliptic springs, straps at the ends of said springs, a bolt depending from the side bars and guiding the strap, and a spring on the bolt supporting the strap, substantially as described.

63. The combination with the side bars, of the longitudinally-disposed semi-elliptic springs, straps at the ends of each of the said springs, a bolt for each of said straps movably hung from the side bars, the strap being adapted to move up and down on the bolt as a guide, a spring on each of the bolts supporting the straps, and a cross-bolster transversely connecting said semi-elliptic springs, substantially as described.

64. The combination with the side bars, of the longitudinally-disposed semi-elliptic springs, rectangular straps engaging the ends of each of said springs, a bolt for each of said straps depending from the side bars and extending into said strap, a seat on each of the bolts, a spring on each of the bolts extending between the seat and the top of said strap, and a cross-bolster transversely connecting said semi-elliptic springs, substantially as described.

65. The combination with the side bar, of the conical apertures formed in and extending through the side bars, bolts movably suspended from the side bars and passing through the apertures, the seat on the bolt, a rectangular strap having a top cross-bar in line with the side bar, an aperture formed in the said cross-bar through which the said bolt passes, and a spring extending between the seat and said top cross-bar, substantially as described.

66. The combination with the side bars, of the longitudinal semi-elliptic springs suspended therefrom, a transverse plank connecting said springs below the side bars, a bar with a central elevation on said plank, transoms secured to said side bars longitudinally in line with said bar, yokes on said bar, springs on the yokes, side bearings on the springs, and a center bearing on said elevation, substantially as described.

67. In a car-truck, the combination with the side bars and a bolster, of the upwardly-extending bifurcated castings on the bolster, said castings straddling the side bars and having a solid head above the side bars, springs in separated recesses in said head, and a bearing-plate having depending lugs, the plate resting on the springs and the lugs entering the springs, substantially as described.

68. The combination with the casting having separated recesses formed in the top thereof, a coiled spring in each of said recesses, a plate on said spring, and lugs depending from said plate into said recess and into the coil of each of the springs, substantially as described.

69. The combination with the casting having a recess in its top, a spring in the recess, a flush-top bearing-plate on said spring, a lug depending from said plate and extending into said spring, and a recess in said lug opening out of the plate, substantially as described.

70. The combination with the side bars, of the cross-bar supported by the side bars, the yokes secured to said bar and straddling the side bars, and a spring interposed between each of the side bars and the inner members of each of the yokes, substantially as described.

71. The combination with the side bars, of the cross-bar supported by the side bars, the yokes secured to said bar and straddling the side bars, a barrel extending from the inner members of each of the yokes, and a spring in each of the barrels engaging the side bars, substantially as described.

72. In a car-truck, the combination of the cross-bar, the leaf-springs below the cross-bar, the bearing-yokes above the cross-bar, flanges on each of the yokes, straps passing through said flanges and cross-bar and embracing said springs, and nuts on the ends of the straps resting on said flanges, substantially as described.

73. In a car-truck, the combination of the cross-bar, the leaf-springs below the cross-bar, the arch-bar resting at its ends on the cross-bar, the bearing-yokes on the arch-bar, flanges on the yokes, straps passing through said flanges cross and arch bars and embracing said springs, and nuts on the ends of the straps resting on said flanges, substantially as described.

74. In a bolster, the combination with the horizontal cross-bar 23, of the superposed arched bar having intermediate portions 67 converging to the cross-bar, and horizontal ends resting on the cross-bar, a central arched block having wedge-shaped ends interposed between the cross and arched bars, elevated castings on the horizontal ends, side bearings on the castings, means for supporting the bolster, and a center bearing on the arch, substantially as described.

75. In a body-bolster, the combination with the car-sills of the flat cross-bar 95 having ends bent down and outward to engage the side and bottom of each of the sills 100, the inverted arch-bar 96 having ends 97, 98 likewise disposed on the ends of the cross-bar 95, an inverted arch-block having wedge-shaped ends interposed between the cross and arch bars, and a body-bearing secured to said arch, substantially as described.

76. In a motor-support, the combination with the upper and lower chord of the side frames, of the hangers secured to the upper and lower chords of each side frame, seats extending inwardly from the lower ends of said hangers, bolts on the seats, springs on each of the seats, and a cross-bar interposed between the springs on each of the seats, substantially as described.

77. The combination with the depending arms of the axle-box yokes, of the pedestal tie-bar of angle-iron, the vertical web of which is secured in a recess in each of said arms, the horizontal web extending under the arms, substantially as described.

78. In a car-truck, the combination with the side bars of the truck-frame, of longitudinally-disposed semi-elliptic springs supported by the side bars, a bottom cross-beam resting on and extending between said springs below the side bars, a top cross-beam having a central elevation for supporting a center bearing and horizontal ends resting on the ends of the bottom cross-beam below the side frames, straps securing the springs and beams together, and transoms extending between the side bars for guiding the top beams, substantially as described.

79. In a car-truck, the combination with the side frames having axle-box pedestals, longitudinal semi-elliptic springs disposed below the top bar of the side frames, links having enlarged heads depending from the top bars at or adjacent to said pedestals and providing a universal joint for the support of said springs within the top bars, and a cross-beam tying said springs together below the top bars, substantially as described.

80. The combination in a car-truck, of the side frames, the semi-elliptic springs, a cross-bolster secured to said semi-elliptic springs, links suspended from the side bars and attached to said springs, and further springs combined with said links adapted to oppose the motion of the side frames or the semi-elliptic springs, substantially as described.

81. The combination in a car-truck, of the side frames, the semi-elliptic springs, a cross-bolster resting on the semi-elliptic springs, links, and springs combined with said links, said links deriving their support from the side frames and connecting the ends of the semi-elliptic springs with the side frames, substantially as described.

82. The combination in a car-truck, of the side frames, springs suspended from the side frames, resilient members suspended by said springs, and a cross-bolster resting on said members, substantially as described.

83. The combination with the side frames of a car-truck, of the jointed links depending from the side frames, semi-elliptic springs secured to the ends of the links and suspended from the side frames, further springs included in said suspension, and a cross-bolster connecting the semi-elliptic springs, substantially as described.

84. The combination with the side frames, of the longitudinal semi-elliptic springs, jointed links secured to the ends of the semi-elliptic springs and hung from the side frames, spiral springs surrounding the links and providing a resilient support for the semi-elliptic springs through the links from the side frames, and a bolster connecting the said semi-elliptic springs, substantially as described.

85. The combination in a car-truck, of the side frames, springs supported by the said frames, links suspended from the side frames and combined with said springs, a bolster, a resilient support for said bolster on said springs, side bearings, and springs supporting the side bearings on the bolster, substantially as described.

86. The combination in a car-truck, of the side frames, spiral springs supported by the side frames, jointed links suspended from the side frames and combined with said springs, a bolster, leaf-springs supporting said bolster on said spiral springs, side bearings, and spiral springs supporting the side bearings on the bolster, substantially as described.

87. In a car-truck, the combination with the side frames of a car-body-supporting bolster, pivotal supports for the bolster depending from the truck-frame, a resilient element directly secured to the bolster and springs for supporting said resilient element through said pivotal supports, substantially as described.

88. In a car-truck, the combination with the side frames, of the cross-bolster suspended below the side frames by semi-elliptic springs and pivotal links, said links comprising a plurality of sections movably secured together, and further springs combined with said links to elastically suspend the said semi-elliptic springs from the side frames, substantially as described.

89. In a car-truck, the combination with the side frames, of the cross-bolster suspended below the side frames by semi-elliptic springs and pivotal links, said links comprising a plurality of sections movably secured together, and spiral springs about and combined with said links to elastically suspend said semi-elliptic springs from said side frames, substantially as described.

90. In a car-truck, the combination with the side frames, each comprising two pedestals and upper and lower beams, of a car-body-supporting bolster, a plurality of half-elliptic springs arranged between the upper and lower longitudinal beams of the frames and connected to the ends of the bolster and link appliances connected to the ends of said half-elliptic springs, and flexibly supported at their upper ends on said upper beams, substantially as described.

91. The combination in a car-truck, of side frames, comprising pedestals, upper and lower side beams connecting the pedestals, axle-boxes in the pedestals, a bolster, half-elliptic springs arranged between the upper and lower side beams and supporting the bolster, links, and spring-supports therefor suspended from the upper beams and supporting the half-elliptic springs between the upper and lower beams, substantially as described.

92. The combination, in a car-truck, of side frames, each comprising upper and lower longitudinal beams and pedestals, half-elliptic springs arranged between the upper and lower beams, a bolster supported thereby, the ends of the half-elliptic springs being supported from the upper beams by spring-equipped appliances, substantially as described.

93. The combination in a car-truck of the side frames, each comprising upper and lower beams and pedestals, of half-elliptic springs arranged beneath the upper side beams, a bolster supported by said half-elliptic springs and appliances connected to the ends of said half-elliptic springs, and supporting them from the side frames, and spiral springs coacting with said appliances, by which the half-elliptic springs are suspended, substantially as described.

94. The combination in a car-truck, of side frames, each comprising upper and lower longitudinal beams and pedestals, with half-elliptic springs arranged between the upper and lower longitudinal beams, a car-body-supporting bolster supported by said half-elliptic springs and adapted to carry the weight of the car-body at its center, the ends of said half-elliptic springs being suspended from the upper longitudinal beams by spring-equipped appliances, substantially as described.

95. The combination, in a car-truck, of the side frames, comprising pedestals, upper beams and lower beams between the pedestals, axle-boxes in the pedestals, springs between the axle-boxes and the tops of the pedestals, a bolster, half-elliptic springs which support the bolster, and spring-supporting links which pass through the upper beams and are supported from their upper edges, substantially as described.

96. In a car-truck, the combination with the side frames, each comprising two pedestals, an upper longitudinal beam and a lower longitudinal beam of a car-body-supporting bolster, half-elliptic springs supporting said bolster and located between said upper and lower longitudinal beams of the respective side frames, and appliances for suspending said springs between the upper longitudinal beams and the lower longitudinal beam, substantially as described.

97. In a car-truck, the combination with the side frames, each comprising two pedestals, an upper longitudinal beam and a lower longitudinal beam, of a car-body-supporting bolster, half-elliptic springs located between said upper and lower longitudinal beams and supporting the bolster, and link appliances secured to the ends of said springs and movably suspended between the sides of said upper longitudinal beams, substantially as described.

98. In a car-truck, the combination with the side frames, each comprising two pedestals, an upper longitudinal beam and a lower longitudinal beam, of a car-body-supporting bolster, half-elliptic springs connected to the ends of said bolster and supporting the same, and elastic link appliances secured to the ends of said springs and suspended from within the upper longitudinal beams, substantially as described.

99. In a car-truck, the combination with the side frames, each comprising two pedestals, an upper longitudinal beam and a lower longitudinal beam, of a car-body-supporting bolster, half-elliptic springs upon which the ends of said bolster rest, and links suspended from within the upper longitudinal beams and supporting the ends of said springs for the purpose of permitting lateral displacement of said springs with relation to the side frames, substantially as described.

100. In a car-truck, the combination with the side frames, each comprising two pedestals, an upper longitudinal beam and a lower beam interposed between the pedestals, of a car-body-supporting bolster, and spring-actuated appliances on which the ends of the bolster directly rest for sustaining said bolster inserted between said beams and suspended from within said interposed upper beams, substantially as described.

101. In a car-truck, the combination with the side frames, each comprising two pedestals, and a longitudinal beam interposed between the same, of a car-body-supporting bolster, half-elliptic springs upon which the ends of said bolster rest, and suspending appliances for the ends of said springs inserted between the sides of one of the beams of the side frames, substantially as described.

102. In a car-truck, the combination with the side frames, of a car-body-supporting bolster elastically suspended from the upper beams of said side frames by appliances which pass between the sides of the said beams and which permit said bolster to move longitudinally and transversely with reference to the side frames, substantially as described.

103. In a car-truck, the combination with the side frames, of a car-body-supporting bolster, bolster-supporting spring-supports supported from the side frames to permit the bolster to move vertically and appliances suspended from the upper beams of the side frames and sustaining the spring-supports for the bolster and permitting the latter to move transversely and longitudinally with reference to the side frames, substantially as described.

104. In a car-truck, the combination with the side frames, each comprising two pedestals, an upper longitudinal beam and a lower longitudinal beam, of a pair of transoms arranged transversely of the truck-frame and secured to the upper longitudinal beams, a car-body-supporting bolster arranged to operate between said transoms, half-elliptic springs supporting said bolster and located between the upper and lower longitudinal beams at each side of the truck-frame, and suspending appliances connected to the ends of said half-elliptic springs and to the upper longitudinal beams and constructed to swing longitudinally as well as transversely of the truck, substantially as described.

105. In a car-truck, the combination with the side frames, each comprising two pedestals, an upper longitudinal beam and a lower longitudinal beam, of a car-body-supporting bolster, a plurality of half-elliptic springs arranged between the upper and lower longitudinal beams of the side frames and connected to the ends of the bolster by suitable yokes, link appliances connected to the ends of said springs and flexibly supported at their upper ends between the sides of the upper longitudinal beams and adapted to have motion longitudinally as well as transversely of the truck, substantially as described.

106. In a car-truck, the combination with the side frames, including upper and lower longitudinal beams, of half-elliptic springs suspended between said upper and lower beams, and a car-body-supporting bolster consisting of a flat bar secured to aforesaid half-elliptic springs and link appliances connected to the ends of said springs and suspended from the upper longitudinal beams of the side frames, substantially as described.

107. In a car-truck, the combination with the side frames, each comprising two pedestals, an upper beam and a lower longitudinal beam, of a car-body-supporting bolster, half-elliptic springs supporting said bolster and located between said upper and lower longitudinal beams of the respective side frames, appliances for suspending the half-elliptic springs between said upper and lower longitudinal beams, journal-boxes operating within the pedestals, and spiral springs located directly over the journal-boxes within the pedestals, substantially as described.

108. The combination, in a car-truck, of the side frames, comprising pedestals, upper and lower beams between the pedestals, a bolster with a center bearing, the ends of the bolster extending below the upper beams, half-elliptic springs between the upper and lower beams and to which the bolster ends are secured, and spring devices supported from the upper beams and supporting the ends of the half-elliptic springs, substantially as described.

109. The combination, in a car-truck, of the side frames, comprising pedestals, upper beams and lower beams between the pedestals, a bolster with a center bearing and having ends inclined down and terminating in horizontal parts below the upper beams, half-elliptic springs between the side beams and to which the horizontal parts are secured, and spring devices supported from the upper beams supporting the ends of the half-elliptic springs, substantially as described.

110. In a car-truck, the combination with the side frames each comprising two pedestals, an upper longitudinal beam and a lower longitudinal beam, of a car-body-supporting bolster, half-elliptic springs upon which the ends of said bolster rest, and universal link appliances secured to the ends of said springs and suspended from between the sides of the upper longitudinal beam, substantially as described.

111. In a car-truck, the combination with the side frames, of a car-body-supporting bolster, half-elliptic springs upon which the ends of said bolster rest, and universal links suspended from a point within the side frames and supporting the ends of said half-elliptic springs, substantially as described.

Signed in the city and county of Philadelphia, State of Pennsylvania, this 20th day of January, 1897.

GEORGE M. BRILL.

Witnesses:
R. S. REED,
R. W. BROODBENT.